Patented Dec. 4, 1923.

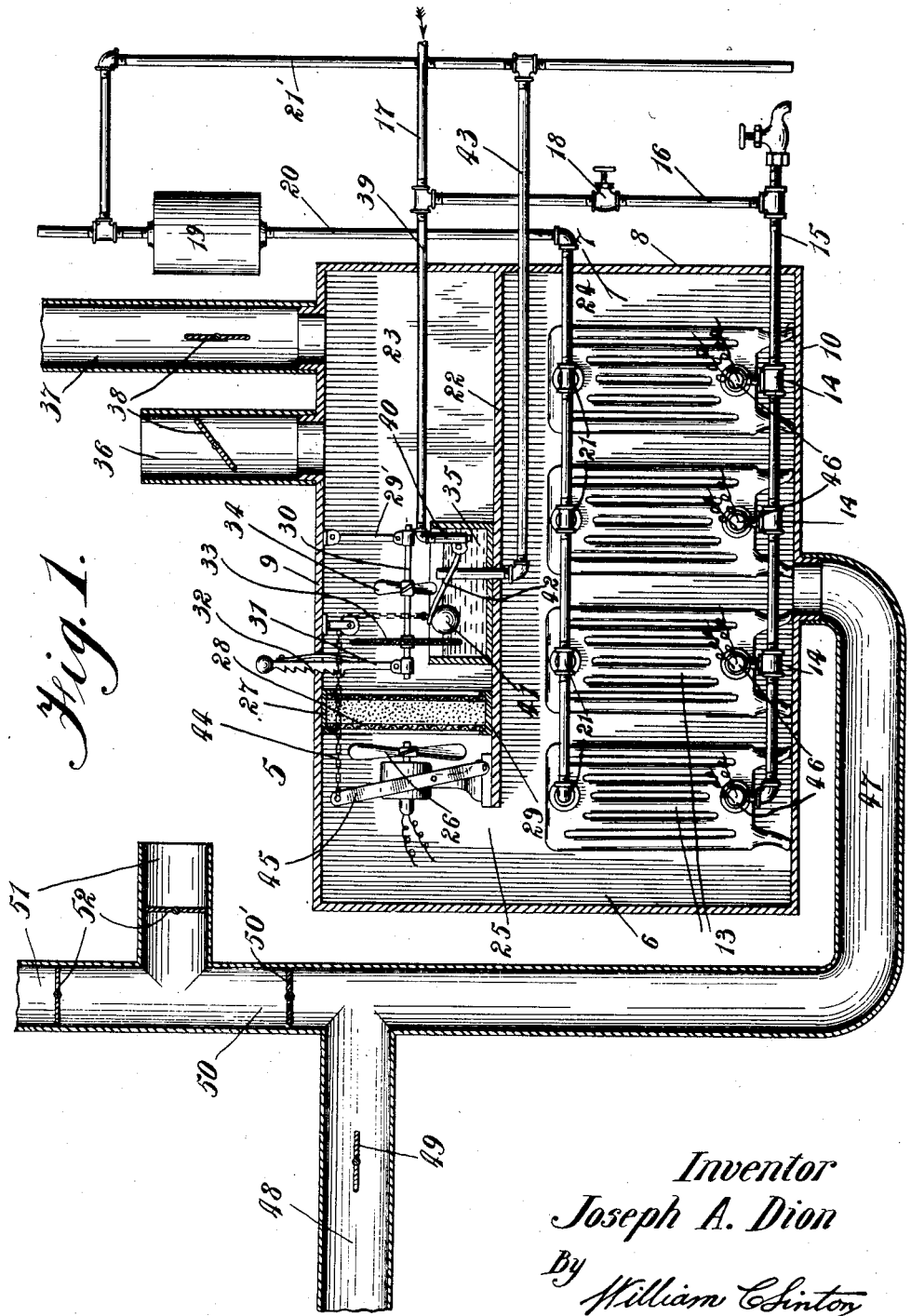

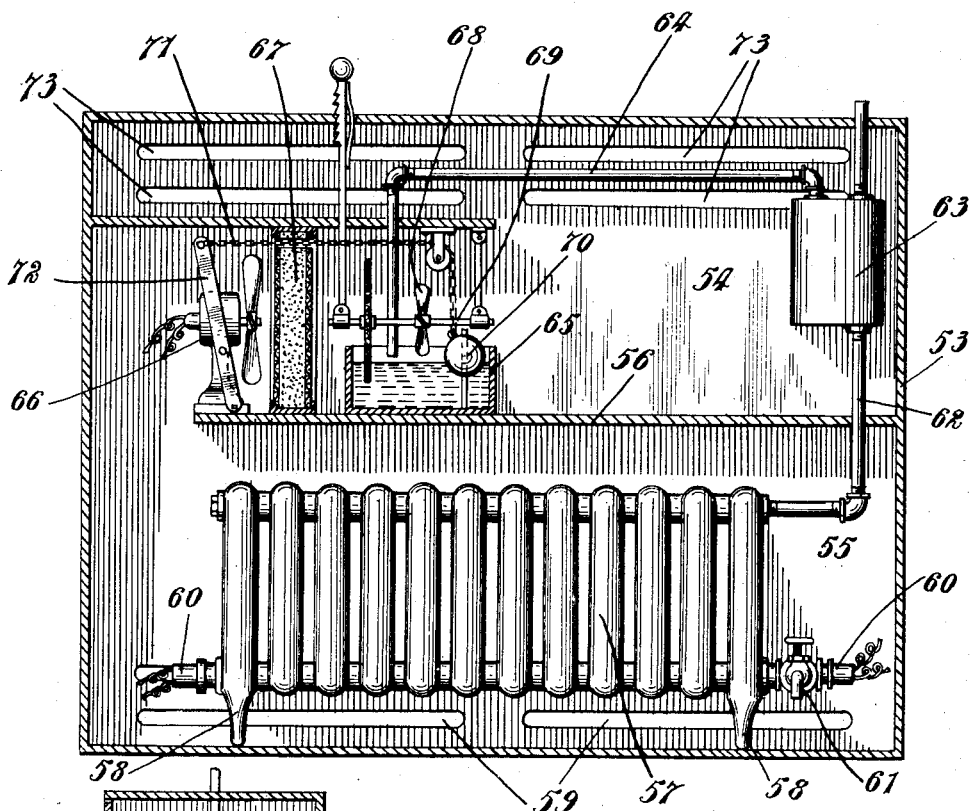
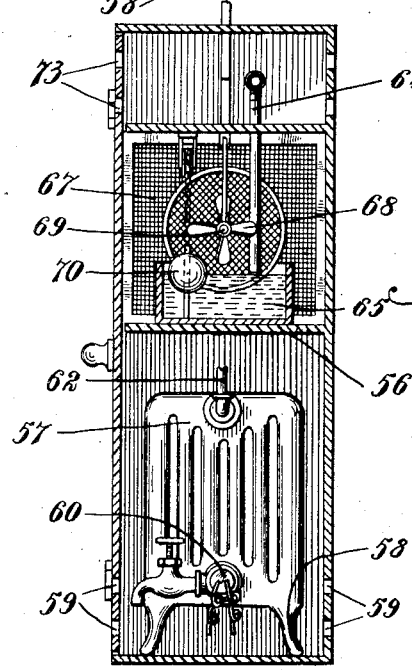

1,476,441

UNITED STATES PATENT OFFICE.

JOSEPH ALPHONSE DION, OF FORT WILLIAM, ONTARIO, CANADA.

HEATING SYSTEM.

Application filed March 5, 1921, Serial No. 449,954. Renewed September 10, 1923.

*To all whom it may concern:*

Be it known that I, JOSEPH A. DION, a subject of the King of Great Britain, residing at Fort William, Province of Ontario, Canada, have invented certain new and useful Improvements in Heating Systems; and I do hereby declare that the following is a full, clear, and exact description of the invention, such as will enable others skilled in the art to which it appertains to make and use the same.

The present invention relates to new and useful improvements in heating systems.

The primary object of the invention is the provision of a heating system particularly designed for heating houses and the like wherein electricity is employed as the heating medium in combination with hot water or the like.

Another object of the invention is the provision of a heating and ventilating system so constructed that either hot or cold air, as is desired, can be supplied to the several rooms of a building for the purpose of either heating or cooling the same.

Another object of the invention is the provision of a moistening means whereby the air which is carried to the rooms for heating purposes will be sufficiently moistened to promote healthful living conditions.

A still further object of the invention is the provision of a system such as above referred to which will be comparatively simple and inexpensive to manufacture, reliable and efficient in use, and readily operated.

With the above and other objects in view, the present invention resides in the novel features of construction, formations, combinations and arrangements of parts to be hereinafter more fully described, claimed, and illustrated in the accompanying drawings forming a part of the present application, and in which:

Figure 1 is a longitudinal sectional view taken through one form of the apparatus used for heating a plurality of rooms of a building or the like;

Figure 2 is a similar view taken through a modified form of the invention in which the same is designed on a similar scale for the purposes of heating but one room only or a plurality of communicating rooms; and, Figure 3 is a transverse sectional view taken through the apparatus disclosed in Figure 2.

Referring now to the accompanying drawings by corresponding characters of reference throughout the several views, the numeral 5 designates in general my improved apparatus which consists of a rectangular casing 6 comprising opposite side and end walls 7 and 8, a top 9 and a bottom 10.

On the bottom 10 are positioned a plurality of radiators 13 which are connected by the nipples 14 to a supply pipe 15 through which water is supplied to the said radiators 13.

This supply pipe 15 is connected by a vertical extension 16 to the water inlet 17 and water to the radiators 13 may be controlled by a valve 18 secured to the before described pipe 16.

An expansion tank is shown at 19 and is connected by a pipe 20 and nipples 21 to the upper ends of the radiators 13 so that the expansion of the water will be taken up by the tank 19 which communicates with the overflow pipe 21'.

A horizontally disposed partition 22 is mounted in the cabinet 6 dividing the latter into upper and lower compartments 23 and 24 which communicate at one end, as shown at 25 by the termination of the partition 22 short of the adjacent end wall 6.

A fan 26 is mounted upon the partition 22 adjacent the passage 25, while positioned in advance thereof is a receptacle 27 formed from reticulated side members 28 held in a suitable frame 29 in spaced relation so that suitable disinfectant and purifying chemicals may be held therebetween, but which are of such nature as to permit the wind blown from the fan 26 to pass freely therethrough.

A hanger 29' is mounted in advance of the receptacle 27 and has journaled therein one end of a horizontal shaft 30 the opposite end of which is journaled in an adjustable hanger 31 which may be locked in its various adjusted positions by means of the spring and rack mechanism shown at 32 so that the end of the shaft 30 supported thereby can be raised or lowered as desired.

A fabric disk is shown at 33 and is keyed to the shaft 30, while a fan 34 is likewise keyed to the said shaft 30 in spaced relation thereto so that the wind from the fan 26 by striking the blades of the fan 34 will impart a rotary movement to the shaft 30 causing the disk 33 to revolve near the liquid contained within the tank 35, thus moistening the air which is driven upwardly through the pipes 36 and 37 which lead to the several floors of a building.

These hot air supply pipes 36 and 37 are equipped with suitable dampers 38 for the purpose of controlling the amount of air supplied to the rooms.

The tank 35 may be supplied with water or other fluid through the feed pipe 39 which connects with the inlet pipe 17 at its juncture with the pipe 16 and terminates in a valve controlled downwardly projecting extension 40 which extends into the tank 35. The supply of water through this valve controlled extension 40 is governed by a float 41 which is attached to a lever 42 which actuates the valve in the said extension.

Obviously, as the supply of water within the tank 35 decreases, the valve will be opened and a fresh supply admitted to the tank. Upon the upward movement of the float 41 caused by the filling of the tank, the said valve is closed and the supply of water cut off.

A supplemental overflow pipe is shown at 43 and projects at one end upwardly into the tank 35 and is connected at its opposite end to the overflow pipe 21 to prevent any undesired leakage of water in the event of the valve of the extension 40 failing to close.

A chain 44 likewise connects the float 41 with the controlling arm 45 of the fan 26 so that when the supply of water is diminished in the tank 35 the fan will cease to operate.

The water within the radiators 13 is heated by suitable thermo-electric heating elements designated by the numeral 46 which projects into the radiators as clearly shown in Figure 1.

These radiators 13, when the water has become heated, heat the air within the lower compartment 24 which flows upwardly through the passage 25 into the upper compartment 23 from whence it will be forced by the fan 26 upwardly to the hot air pipes 36 and 37, being moistened during its passage through the compartment 23 by the water from the tank 35.

A cold air supply pipe is shown at 47 and communicates with the compartment 24 through the bottom 10 of the cabinet 6. This cold air supply pipe connects with a pipe 48 at its upper end which leads to the atmosphere and is controlled by a damper 49, while a cold air pipe 50 extends from the pipe 48 at its juncture with the cold air pipe 47 and terminates in a plurality of branches 51 which lead to the several rooms of a building for the purpose of drawing cool air from the rooms.

These extensions 51 are controlled by suitable dampers shown at 52.

Referring now more particularly to Figures 2 and 3 of the drawings, which illustrate a modified form of my invention wherein a similar device for the purpose of heating one room or a series of communicating rooms, is employed, the numeral 53 designates in general the cabinet which is separated into upper and lower compartments 54 and 55 by the horizontal partition 56, as is the case in Figure 1 of the drawings. In these two figures, however, the plurality of radiators 13 which are disposed in series are dispensed with and a single horizontal radiator shown at 57 is employed, being mounted in spaced relation from the bottom of the cabinet 53 upon suitable supports 58. Below the radiator 57, the sides of the cabinet 53 are provided with elongated slots 59 which serve to permit the cool air to flow into the cabinet at the lower end thereof. The radiator 57 is adapted to contain water which is supplied thereto from any suitable source and which is heated by means of the heating elements 60 which, as is the case with the radiators 13, are of thermo-electric construction. A suitable drain cock 61 is provided for the radiator 57 while an expansion pipe 62 leads to the expansion tank 63 the overflow from which passes through a feed pipe 64 to the water receptacle 65 mounted upon the partition 56.

In this form of the invention, the fan which corresponds to the fan 26 is designated at 66, while the receptacle for containing the chemicals is shown at 67, and the fan which corresponds to the fan 34 is shown at 68 and drives the shaft 69 in a similar manner.

In this form of the invention, the valve controlled extension 40 is dispensed with and a float 70 is attached by a chain 71 to the controlling arm 72 of the fan 66 and actuates the latter in a manner similar to that shown in Figure 1.

The opposite side walls of the cabinet at their upper ends are provided with elongated slots 73 through which the heated air is blown by the fan 66.

In other respects the two inventions are similar.

The pipe 50 is provided below its branches with a damper 50' as shown in Figure 1.

From the foregoing description, taken in connection with the accompanying drawings, it will be manifest that a heating and ventilating apparatus for buildings, rooms, and the like is provided, which will fulfil all of the necessary requirements of such a device, and it will be understood in this connection, that various minor changes in the specific details of construction can be resorted to within the scope of the appended claims, without departing from the spirit or sacrificing any of the advantages of the invention.

Having thus fully described the invention, what I claim as new and desire to protect by Letters Patent is:—

1. An apparatus of the character described, including a cabinet, said cabinet having a pair of compartments therein, means for heating the air within one compartment, a fan for forcing the air through the other compartment, and means for moistening the air during its passage through the other compartment.

2. The combination in a heating apparatus such as described, of a cabinet, said cabinet including spaced compartments, means for feeding air to one of said compartments, means for heating the air within one of the compartments, means for forcing the air from one to the other of the compartments, means for disinfecting said air, and means for directing the air from the cabinet to the desired location.

3. A heating apparatus such as described including a casing comprising spaced compartments, a heating means within one of said compartments for heating the air admitted therein, means for driving the air from one compartment to another of the compartments, means for disinfecting said air during its passage from one to the other of the compartments, means for moistening the air during its passage from one to the other of the compartments, and means for discharging the air after being disinfected and moistened from said cabinet.

4. An apparatus of the character described, comprising a cabinet having a partition therein separating the cabinet into upper and lower compartments, a heating means in the lower compartment, a fan in the upper compartment for forcing the air therethrough, and disinfectant and moistening means cooperating with the fan, as and for the purposes set forth.

5. The combination in a heating apparatus such as described, of a cabinet, a partition therein dividing the cabinet into upper and lower communicating compartments, a heating means within the lower compartment, a fan mounted in the upper compartment for forcing the air therethrough, a disinfectant; means through which the air is forced, and means for moistening said air prior to its passage out of said cabinet.

6. In an apparatus of the character described, the combination of a cabinet, a radiator mounted in one end of said cabinet for heating the air admitted to the cabinet, a fan for forcing the air through the opposite end of said cabinet, a disinfectant supporting means through which the air is forced, and a moistening tank in the path through which the air is forced for moistening the air prior to its passage from the cabinet.

7. In an apparatus of the character described, the combination of a cabinet having a partition therein dividing the latter into upper and lower compartments, a radiator in the lower compartment, means for heating the water contained therein, a fan mounted upon one end of the partition within the upper compartment for forcing the heated air from the lower compartment through the upper compartment, a disinfectant receptacle through which the air is forced, a tank within the upper compartment, and a rotatable element for removing water from the tank and moistening the air during its passage to the upper compartment.

8. An apparatus of the character described, including air heating means, a fan for driving the air through said apparatus, a tank for containing water, a rotatable shaft, a fabric disk keyed to said shaft and actuated by the air blown from the first mentioned shaft, substantially as and for the purposes set forth.

9. An apparatus of the character described, including a cabinet having upper and lower compartments therein, means within the lower compartment for heating the air admitted thereto, a fan for blowing the said heated air through the upper compartment, a water receptacle, an adjustable shaft mounted thereabove, a fabric disk keyed to said shaft and rotatable therewith, one edge of said disk being immersed in the water contained within the receptacle, and a fan keyed to the shaft and actuated by the first mentioned fan for rotating the disk through the water within the receptacle and moistening the air blown by the fan through said upper compartment.

10. The combination in an apparatus of the character described, of a cabinet having a partition therein dividing the cabinet into upper and lower compartments having a communicating passage, a radiator mounted in the lower compartment for heating the air fed therein, said tank adapted to contain water, heating means disposed within the radiator for heating the water, a fan mounted upon the partition adjacent said communicating passage of the compartments, a disinfectant receptacle including reticulated side members mounted in advance of the fan, a water receptacle mounted on the partition in advance of the disinfectant receptacle, and means for supplying water from the receptacle to the air blown through the upper compartment by said fan.

In witness whereof I have hereunto set my hand.

JOSEPH ALPHONSE DION.